(12) United States Patent
Fahnestock

(10) Patent No.: US 10,970,739 B2
(45) Date of Patent: Apr. 6, 2021

(54) METHODS AND APPARATUS TO DETECT ADVERTISEMENTS EMBEDDED IN ONLINE MEDIA

(71) Applicant: The Nielsen Company (US), LLC, New York, NY (US)

(72) Inventor: Justin Fahnestock, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 385 days.

(21) Appl. No.: 16/137,243

(22) Filed: Sep. 20, 2018

(65) Prior Publication Data
US 2019/0130438 A1    May 2, 2019

Related U.S. Application Data

(63) Continuation of application No. 14/620,052, filed on Feb. 11, 2015, now abandoned.

(51) Int. Cl.
*G06Q 30/02* (2012.01)
(52) U.S. Cl.
CPC ..... *G06Q 30/0246* (2013.01); *G06Q 30/0272* (2013.01)
(58) Field of Classification Search
None
See application file for complete search history.

(56) References Cited

U.S. PATENT DOCUMENTS

| 5,151,788 A | 9/1992 | Blum |
| 5,748,263 A | 5/1998 | Ball |
| 5,933,811 A | 8/1999 | Angles et al. |

(Continued)

FOREIGN PATENT DOCUMENTS

WO    0237828    5/2002

OTHER PUBLICATIONS

C. Adrian Grahams, "How to Embed YouTube with Advertising", available on Oct. 20, 2011, retrieved from https://smallbusiness.chron.com/embed-youtube-advertising-28701.html (Year: 2011).*

(Continued)

*Primary Examiner* — Sam Refai
(74) *Attorney, Agent, or Firm* — Hanley, Flight & Zimmerman, LLC

(57) ABSTRACT

Example methods disclosed herein include determining a first time associated with an event notification embedded in primary media received from an online media provider by an audience measurement entity, the primary media also to be distributed by the online media provider to a consumer device, the determining of the first time including rendering a graphical representation of progress associated with presentation of the primary media, the graphical representation having a length and including the event notification at a location, and determining the first time based on the length and the location of the event notification. Example methods also include determining a second time associated with a media feature of the primary media, and indicating, without accessing the consumer device, that secondary media is also to be embedded in the primary media distributed to the consumer device when a difference between the first time and the second time meets a threshold.

20 Claims, 12 Drawing Sheets

(56) References Cited

U.S. PATENT DOCUMENTS

| | | | |
|---|---|---|---|
| 6,449,021 | B1 | 9/2002 | Ohta et al. |
| 6,553,178 | B2 | 4/2003 | Abecassis |
| 6,675,174 | B1 | 1/2004 | Bolle et al. |
| 7,043,746 | B2 | 5/2006 | Ma |
| 7,984,462 | B2 | 7/2011 | Deng |
| 8,281,332 | B2 | 10/2012 | Rajaraman et al. |
| 8,661,111 | B1 | 2/2014 | Lauckhart et al. |
| 8,661,464 | B2 | 2/2014 | Arankalle et al. |
| 8,839,287 | B2 | 9/2014 | Weerasinghe |
| 8,874,468 | B2 | 10/2014 | Gargi |
| 8,925,024 | B2 | 12/2014 | Wright et al. |
| 2011/0157475 | A1* | 6/2011 | Wright .................. H04H 20/14 348/700 |
| 2012/0304223 | A1* | 11/2012 | Sargent .............. H04N 21/4532 725/32 |
| 2014/0081767 | A1 | 3/2014 | Zhang |
| 2016/0232579 | A1 | 8/2016 | Fahnestock |

OTHER PUBLICATIONS

D. Michele Covell et al., "Advertisement Detection and Replacement using Acoustic and Visual Repetition", available on Aug. 3, 2006, retrieved from https://static.googleusercontent.com/media/research.google.com/en//pubs/archive/55.pdf (Year: 2006).*

United States Patent and Trademark Office, "Final Office Action," mailed in connection with U.S. Appl. No. 14/620,052, dated Jun. 20, 2018, 12 pages.

United States Patent and Trademark Office, "Non-final Office Action," mailed in connection with U.S. Appl. No. 14/620,052, dated Mar. 24, 2017, 40 pages.

United States Patent and Trademark Office, "Non-final Office Action," mailed in connection with U.S. Appl. No. 14/620,052, dated Jan. 22, 2018, 14 pages.

United States Patent and Trademark Office, "Final Office Action," mailed in connection with U.S. Appl. No. 14/620,052, dated Sep. 26, 2017, 19 pages.

* cited by examiner

METHODS AND APPARATUS TO DETECT ADVERTISEMENTS EMBEDDED IN ONLINE MEDIA

CROSS-REFERENCE TO RELATED APPLICATION(S)

This patent arises from a continuation of U.S. patent application Ser. No. 14/620,052, which is entitled "METHODS AND APPARATUS TO DETECT ADVERTISEMENTS EMBEDDED IN ONLINE MEDIA," and which was filed on Feb. 11, 2015. Priority to U.S. patent application Ser. No. 14/620,052 is claimed. U.S. patent application Ser. No. 14/620,052 is incorporated by reference herein in its entirety.

FIELD OF THE DISCLOSURE

This disclosure relates generally to advertisement detection and identification, and, more particularly, to identifying advertisements embedded in online media.

BACKGROUND

In recent years, online media delivery (e.g., streaming media delivery) has become a popular medium for the delivery of media to users. As used herein, online media is media delivered from an online media provider to media presentation locations via a data network such as, for example, data delivered on the Internet using the Internet Protocol (IP). Services like Netflix™ and Amazon Instant Video™, as well as on-demand services provided by IP based television services (e.g., AT&T Uverse™) are examples of providers of such online media. Online media is presented to a consumer by a consumer device after the media is transmitted to the consumer device (or a device associated with the consumer device) from an online media provider. The near instant nature of online media and the increase in bandwidth capabilities of Internet service providers and consumer connections have contributed to the availability and popularity of high resolution online media. For example, when a user of an online consumer device selects a movie from an online media provider, such as Netflix™, the movie is presented almost instantly without the user having to wait for the entire movie file to be downloaded to the user's device (e.g., using streaming techniques). Some online media providers have monetized the delivery of such media by including advertisements in the online media.

DETAILED DESCRIPTION

Figure 1:
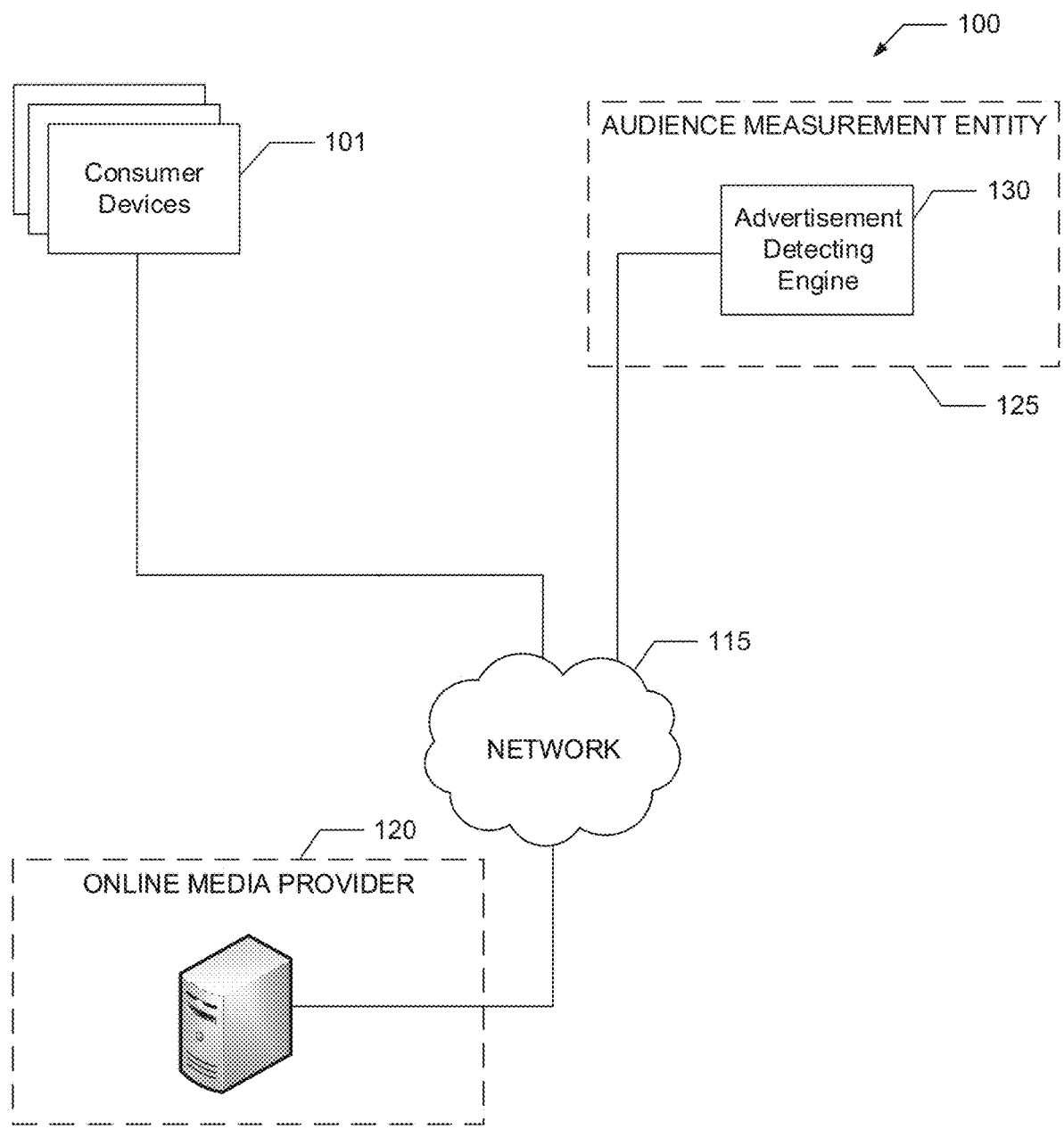
FIG. 1 is a block diagram of an example system for metering the distribution of online media to consumer devices.

As used herein, the term "primary media" refers to media that is selected by users for presentation and/or is otherwise the media that is primarily being presented to users. The primary media may be movies, Internet videos, television episodes, radio shows, songs, news programs, etc. In the examples described herein, the primary media is online media.

As used herein, secondary media refers to media presented in conjunction with (e.g., inserted in, interleaved in, presented before, presented after, etc.) primary media such as advertisements, media associated with the primary media, and/or media unassociated with the primary media.

As used herein, auxiliary data is data that provides information and/or control instructions regarding the presentation of online media associated with the auxiliary data. Auxiliary data may be contained in the online media and/or may be available in another data structure such as a file available from a server at a uniform resource locator (URL). In some examples, such auxiliary data may be stored or contained in a web page associated with a URL (e.g., in hyper-text markup language (HTML) and/or in a cascading style sheet (CSS) code). In other examples, the auxiliary data is embedded in online media and must be extracted (e.g., embedded in a binary file such as an Adobe Flash video file). For example, the auxiliary data may be packaged in a container file used to transmit and/or present the online media.

As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

Online media is frequently used to present live events. However, online media may also be used for non-live events (e.g., a timeshifted media presentation and/or video on demand presentation). Many people now consume online media by streaming the media via consumer devices like computers, game consoles, and/or mobile devices. In many instances, the online media is presented in an application (e.g., a browser) that accesses a web page that initiates an embedded streaming media player for media presentation. Even with such untraditional media distribution, there is a desire to provide revenue-promoting advertisements to such online consumers.

As used herein, the term "embedded" generally refers to a first object enjoined with and/or inserted into a second object. In some examples, the first object and the second object are not readily distinguishable from one another in the second object. Some such examples of embedding includes advertisements inserted into streaming media, media players inserted into web pages, applications inserted into web pages, etc.

In some environments, online media is associated with advertisements that are obtained "on demand." In such environments, at a specified interval during media presentation, an online media player obtains and presents an advertisement that is not pre-embedded in the media and/or stored in the website. For example, at a specified time during presentation, a hyper-text transfer protocol (HTTP) "GET" request is executed by the online media player or the online media provider to obtain an advertisement to present to a consumer. Monitoring the "GET" requests originating from and/or associated with the presentation of online media allows audience measurement entities, such as The Nielsen Company (US), LLC, to determine the identity of the advertisement and credit the advertisement (and corresponding advertisement campaign) with exposure. For example, an audience measurement entity analyzes logs of online media traffic that are sent to the audience measurement entity. The audience measurement entity then provides reports including analytical data such as advertisement exposure and campaign reach determined from the logs.

In some other instances, consumers utilize advertisement blocking (also referred to herein as "Ad-block") software. Such Ad-block software prevents the presentation of advertisements in online media in a variety of ways. For example, some Ad-blocking software blocks "GET" requests by filtering requests that are not associated with currently presenting media and/or requests that are associated with known advertising servers.

As advertisement blocking software has evolved, online media providers have varied their techniques for distributing advertisements. In some systems, online media providers embed advertisements directly into the online media itself. This approach increases the difficulty of blocking the advertisements because no "GET" requests are involved and the advertisements are integrated into the primary media (e.g., integrated into the video and/or audio of the primary media). Unfortunately, advertisement embedding also increases the difficulty for audience measurement entities to detect the advertisements using the prior techniques described above.

Example methods and apparatus disclosed herein detect and credit advertisements and other secondary media embedded in online media (e.g., primary media) using advertisement event notifications present in some online media. Many embedded online media players indicate the presence of advertisements and/or other secondary media using event notifications (e.g., visible marks, icons, graphical overlays, etc. and/or encoded event notifications not visible on a rendered webpage) associated with a displayed progress bar of the online media. However, the event notifications may also indicate the presence of other elements such as, for example, user comments, highlights of the media presentation, etc. In some examples, the event notifications are graphical representations of instances in time at which secondary media (e.g., user comments, advertisements, highlights, etc.) will be presented during the presentation of the online media.

The placement of event notifications in association with a progress bar of an online media player is directed by online media providers. For example, the data directing the presence and/or location of the event notifications (e.g., visible marks, icons, graphical overlays, and/or encoded event notifications not visible on a rendered webpage) may be embedded in the primary media itself by the online media provider. In other examples, the auxiliary data directing the presence and/or location of the event notifications may be encoded in the page data of the URL associated with the online media.

As disclosed herein, in some examples, to detect the presence and/or location of embedded event notifications, the primary media is decoded and analyzed to locate the embedded event notifications. Alternatively, as disclosed herein, the presence and/or location of event notifications may be detected in the page data of a web page associated with a URL (e.g., analyzing graphical interface code governing the rendering of the online media presentation). In yet other examples, as disclosed herein, when the auxiliary data directing the presence and/or location of event notifications is not accessible, image detection methods may be used on the page data of the web page associated with the URL to identify the presence and/or location of the event notifications.

In examples disclosed herein, the locations (e.g., times) of the event notifications on the progress bar are extracted from the online media and/or the page data of the webpage associated with the online media. In some disclosed examples, the locations of the event notifications in online media are leveraged to detect and identify temporal location(s) that may include embedded advertisements in the online media.

In some examples, online media providers change, or rotate, the advertisements presented in online media. For example, during viewing of an online media (e.g., an episode of the television show "Modern Family") at a first time, an advertisement for a cleaning solution may be served. During a subsequent viewing of the same online media (e.g., the same episode of "Modern Family"), a different advertisement (e.g., for a frozen meal) may be served. In some examples, the online media providers associate a plurality of advertisements with particular ones of online media and the advertisements are rotated in and out of the online media based on a variety of factors. Such factors may include, detected demographics of the user to which the online media is being presented (e.g., using cookies), time of online media presentation, online media consumption device type, online media browsing application, random selection, selection to meet contract requirements from advertisers, etc. Accordingly, were one to detect advertisements in a single instance for a particular online media (e.g., by retrieving and/or analyzing the online media a single time), many of the possible advertisements associated with a particular online media may go undetected. Examples disclosed herein repeatedly access media to determine the multitude of advertisements presented with the online media and/or rotation rates for those advertisements. For example, the disclosed examples may utilize methods such as those disclosed in U.S. Pat. No. 8,661,111, which is hereby incorporated by reference in its entirety.

In some examples disclosed herein, online media may be repeatedly accessed by an example advertisement detecting engine using a variety of cookies, user agents, or other identifiers representative of different demographics or simulating other criteria used by media providers in selecting advertisements (e.g., web browser types), such that the advertisements served to a particular demographic or other group may be detected. For example, the episode of "Modern Family" may be accessed a first number of times using a cookie that is associated with a Male age 18-34 to detect the advertisements served to the Male age 18-34 demographic associated with Modern Family. Subsequently, the episode of Modern Family may be accessed a second number of times using a cookie associated with a Female age 35-49 to detect the advertisements served to the Female age 35-49 demographic associated with "Modern Family."

Example methods, apparatus, and articles of manufacture disclosed herein detect and identify advertisements embedded in online media. The example advertisement detecting engine disclosed herein obtains a list of URLs associated with online media. The example advertisement detecting engine accesses a URL identified in the list of URLs, analyzes page data (and/or data embedded in the online media) to determine the presence and/or location of event notifications in the online media. The advertisement detecting engine repeatedly analyzes the online media served at the URLs to detect the plurality of advertisements associated with the online media.

Example methods, apparatus, and articles of manufacture described herein further analyze online media to detect temporal locations of media features such as scene changes, blank frames, audio silence, dramatic volume shifts, etc. that often occur around the beginning and/or end of an advertisement. For example, the media features may be detected at specific times in the presentation of the online media. These detected times (e.g., temporal locations) are stored and used in concert with the detected event notifications to determine the presence of advertisements in the online media. Example methods and apparatus disclosed herein match, correlate, and/or associate temporal locations of (1) the event notifications and (2) the detected media features to detect and identify embedded advertisements in online media. The example methods and apparatus disclosed herein improve the detection of advertisements by combining the detection of event notifications and media features to mitigate the occurrence of "false detections" (e.g., when event notifications identifying comments and/or highlights of online media detected as advertisements). Once extracted, the advertisements may be identified using known methods such as, for example, detection and/or identification of media watermarking and/or signatures. In some examples, the identified advertisements are stored in a database by an audience measurement entity. For example, the advertisements may be stored in the database as associated with the corresponding online media from which the advertisement was detected. That is, each advertisement detected in conjunction with a particular show may be stored with descriptive information denoting the particular show it was presented with. In other examples, the advertisements may be stored and/or associated with descriptive information indicative of: a target audience demographic, detected demographics of the user to which the online media is being presented (e.g., using cookies), a time of online media presentation, an online media consumption device type, online media browsing application, and/or any additional and/or combination of descriptive information regarding the presentation of the advertisement. In some disclosed examples, methods and apparatus generate reports providing details regarding the detected advertisements and/or descriptive information stored and/or associated with the advertisements detected in particular ones of online media.

FIG. 1 is a block diagram of an example environment 100 in which example methods apparatus and/or articles of manufacture disclosed herein may be used for detecting advertisements embedded in online media. The example environment 100 includes the example consumer device 101, an example network 115, and the example online media provider 120, and an example audience measurement entity 125. In the example of FIG. 1, the audience measurement entity 125, such as The Nielsen Company (US), LLC, includes an example advertisement detecting engine 130 for detecting advertisements embedded in online media distributed to consumer devices (e.g., the example consumer device 101) by the online media providers (e.g., the example online media provider 120).

The example consumer device 101 of the illustrated example may be implemented by any device and accompanying software that supports online applications and/or online media. For example, the example consumer device 101 may be a smart television, a tablet, a game console, a mobile phone, a smart phone, an online media device, a computer, a laptop, a tablet, a Digital Versatile Disk (DVD) player, a Roku™ device, an Internet television apparatus (e.g., Google™ Chromecast™, Google™ TV, Apple™ TV, etc.) and/or other electronic devices and/or software. The example consumer device 101 communicates with the example online media provider 120 using the network 115. In some examples, the example consumer device 101 communicates with the example online media provider 120 via the network 115 (e.g., to communicate media metering and/or logging information).

In the illustrated example, the consumer device 101, accesses a URL for the example online media provider 120 to obtain online media served by the example media provider 120. To access the URL, a request for online media is transmitted to the example online media provider 120 via the example network 115. The example online media provider 120 acknowledges the request, and provides the online media to the example consumer device 101 via the example network 115.

The example network 115 may be any type of communications network, (e.g., the Internet, a local area network, a wide area network, a cellular data network, etc.) facilitated by a wired and/or wireless connection (e.g., a cable/DSL/satellite modem, a cell tower, etc.). The example network may be a local area network, a wide area network, or any combination of networks.

The online media provider 120 of FIG. 1 provides data (e.g., media, online media, and/or web pages associated with online media) to be presented on and/or through the consumer device 101 via the network 115. The example online provider 120 may be, for example, an online distribution platform and associated server(s) for audio and/or video media, such as, for example, YouTube™, Spotify™, Vimeo™, Hulu™, WatchESPN™, ESPN Radio™, etc.

The example audience measurement entity 125 of the illustrated example is an entity gathering advertisement metrics and/or audience measurement statistics such as, for example, The Nielsen Company (US), LLC. For example, such an audience measurement entity may desire to determine the possible advertisements served to a media consumer in association with a particular online media.

The example advertisement detecting engine 130 is a device and/or one or more other components connected to the example network 115 located at an audience measurement entity. The advertisement detecting engine 130 contains instructions to detect advertisements in online media. Alternatively, the example advertisement detecting engine 130 may be located in a separate location from the audience measurement entity 125. For example, the example advertisement detecting engine 130 may be a router, a gateway, a server, and/or any device capable of accessing and analyzing online media (e.g., having a processing capability robust enough to perform multimedia processing instructions). For example, a broadband modem and/or router may contain instructions allowing them to act as an advertisement detecting engine 130. According to the illustrated example, the advertisement detecting engine 130 is a discrete device capable of accessing a list of online media URLs and analyzing the online media associated with the URLs.

Other network topologies than those illustrated in FIG. 1 may be utilized with the example methods and apparatus disclosed herein. For example, a proxy server may be included in the environment 100 to deploy the advertisement detecting engine 130. Additionally or alternatively, communications associated with the online media provider 120 (e.g., communications between the example online media provider 120 and the example consumer device 101) may be routed through the example audience measurement entity 125 and/or mirrored to the example audience measurement entity 125. In some such examples, the audience measurement entity 125 monitors and gathers information about the communications with or without information from other devices such as a proxy server.

In the illustrated example of FIG. 1, the example advertisement detecting engine 130 obtains a list of URLs associated with online media from the example online media provider 120. Alternatively, the list of URLs may be obtained from sources such as, for example, web-crawling applications, panel data from devices belonging to a panel of an audience measurement entity, internet beacon data, and/or any suitable aggregator of popular online media URLs.

The example advertisement detecting engine 130 accesses each URL contained in the list of URLs. As described below, the example advertisement detecting engine 130 extracts data from the online media served for each URL and/or data associated with the online media to attempt to determine the presence and/or location of event notifications. As discussed above, the presence and/or location of event notifications are determined from the auxiliary data associated with the online media. For example, the auxiliary data may be analyzed by the advertisement detecting engine 130 via string matching. That is, the auxiliary data is analyzed to identify and/or locate words and/or strings of words (e.g., computer readable instructions) indicative of event notifications, such as, for example, markings on a progress bar (e.g., tick, diamond, icon, etc.).

In some examples, a location of an event notification is determined from the auxiliary data. That is, a temporal location in the progress of the online media file is explicitly stated in a temporal value in the data of the event notification. In other examples, the locations of event notifications are provided as locations relative to the length of a progress bar of the online media. For example, event notification locations may be specified with relative locations when the online media is presented by a media player that scales with the size of a presentation window. In such examples, further processing of the online media and/or page data may be performed to determine the length of the progress bar and the duration of the online media file. The temporal location of the event notifications is then determined using the following equation:

According to the illustrated example, the example advertisement detecting engine 130 downloads, extracts, and/or accesses the online media file from the URL and processes the online media file to identify temporal locations of media features (e.g., blank frames, audio silence, dramatic volume shifts, etc.). For example, media feature detection methods such as those disclosed in Wright et al., U.S. Patent Application Publication No. 2011/0157475 (which is hereby incorporated herein by reference in its entirety) may be used.

The example advertisement detecting engine 130 compares the temporal locations of detected event notifications to the temporal locations of detected media features of the online media file. When the example advertisement detecting engine 130 determines that a temporal location of a detected media feature is within a detection window around a temporal location (e.g., one second before and/or after) of an event notification, the example advertisement detecting engine 130 determines that a start of an advertisement has been detected.

Online media may not include an event notification marking the end of advertisements. Accordingly, when an advertisement start has been detected, the advertisement detecting engine 130 searches for media features temporally located at suspected advertisement durations from the detected advertisement start. For example, online advertisements are generally 15, 30, and/or 45 seconds in duration. Accordingly, the advertisement detecting engine 130 will search for media features at suspected advertisement end times that are at known durations from the detected advertisement start (or any other time). When a media feature is detected at a suspected advertisement end time, the advertisement detecting engine 130 designates this time and/or temporal location as the end of the detected advertisement.

The example advertisement detecting engine 130 of the illustrated example then extracts a portion of and/or the entirety of the online media file around the detected advertisement. In the illustrated example, the detected advertisement is extracted using the determined advertisement start and advertisement end times. The example advertisement detecting engine 130 identifies the advertisement and stores the advertisement as associated with and/or presented by the corresponding online media. For example, a watermark and/or signature are typically embedded in an advertisement and these features allow for identification of the advertisements.

Signature-based media identification generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

Figure 2A:
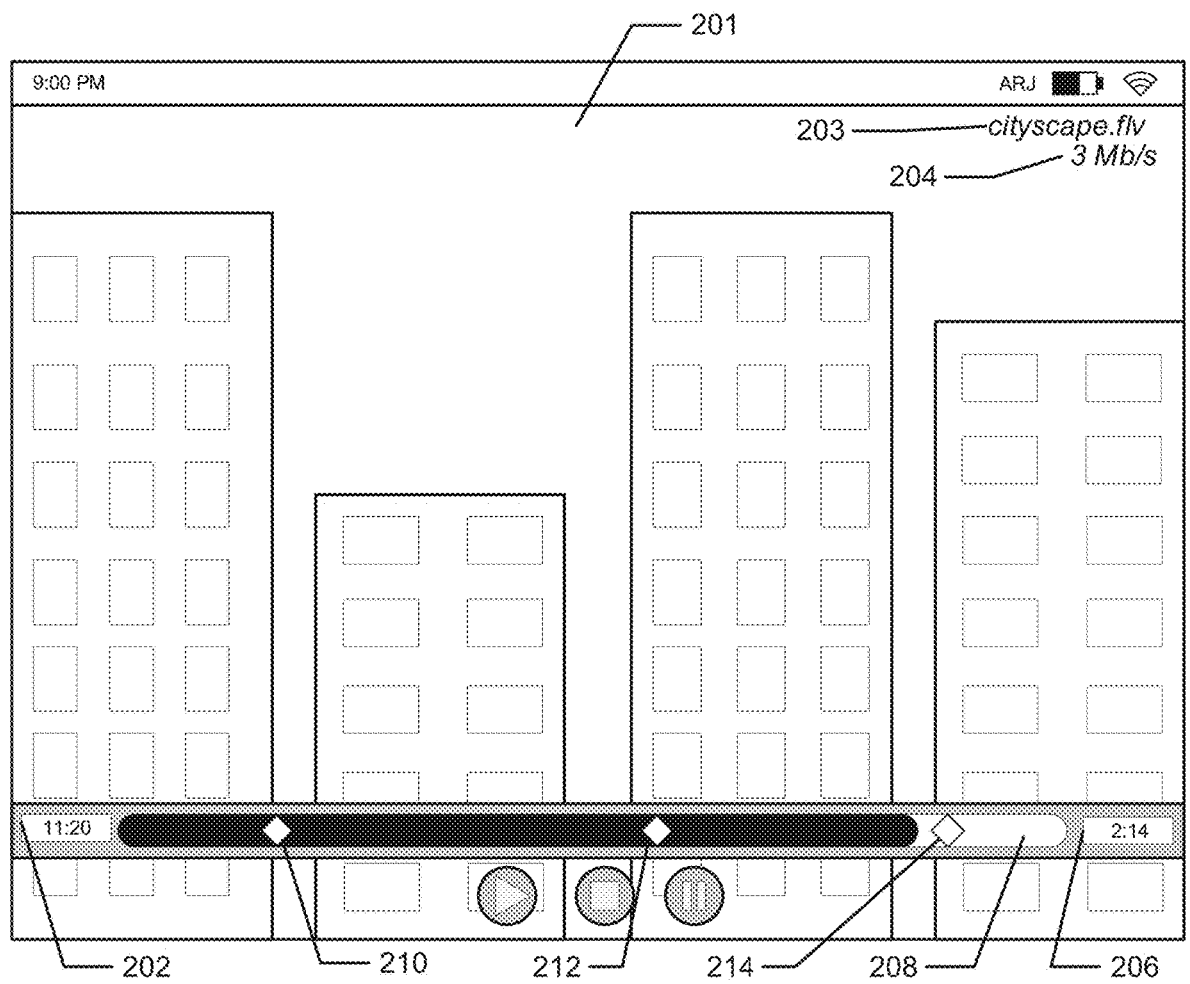
FIG. 2A illustrates a presentation of an example online media application.

FIG. 2A illustrates an example online media presentation 201, executing on one of the example consumer devices 101. The example online media presentation 201 of this example presents media obtained from the online media provider 120 on the corresponding example consumer device 101. The graphical user interface of the online media presentation 201 presents data relevant to the presentation of the online media. For example, the online media presentation 201 of FIG. 2 includes an example elapsed time indicator 202 to display a length of the media presentation session and a total length of the media. An example file ID indicator 203 displays the filename of the online media being presented.

The example online media presentation 201 includes an example bandwidth indication field 204 to display the current bandwidth usage rate of the online media presentation 201. An example time remaining indicator 206 displays the predicted end time of the media presentation as indicated by the example consumer device 101. An example progress bar 208 displays a graphical representation of the time progress of the media presentation based on the values of the example elapsed time indicator 202 and the example time remaining indicator 206.

In the illustrated example, advertisements and/or comments are embedded in the online media and the start time at which the advertisements and/or comments appear as denoted by event notifications 210, 212, 214 in the example progress bar 208. Based on the status shown in the example progress bar 208, the online media presentation 201 of FIG. 2A has already presented advertisements and/or comments at the two times associated with the example first and second event notifications 210, 212. Accordingly, the online media presentation 201 will present a third advertisement when the progress of the online media reaches a third time associated with the example third event notification 214.

Figure 2B:
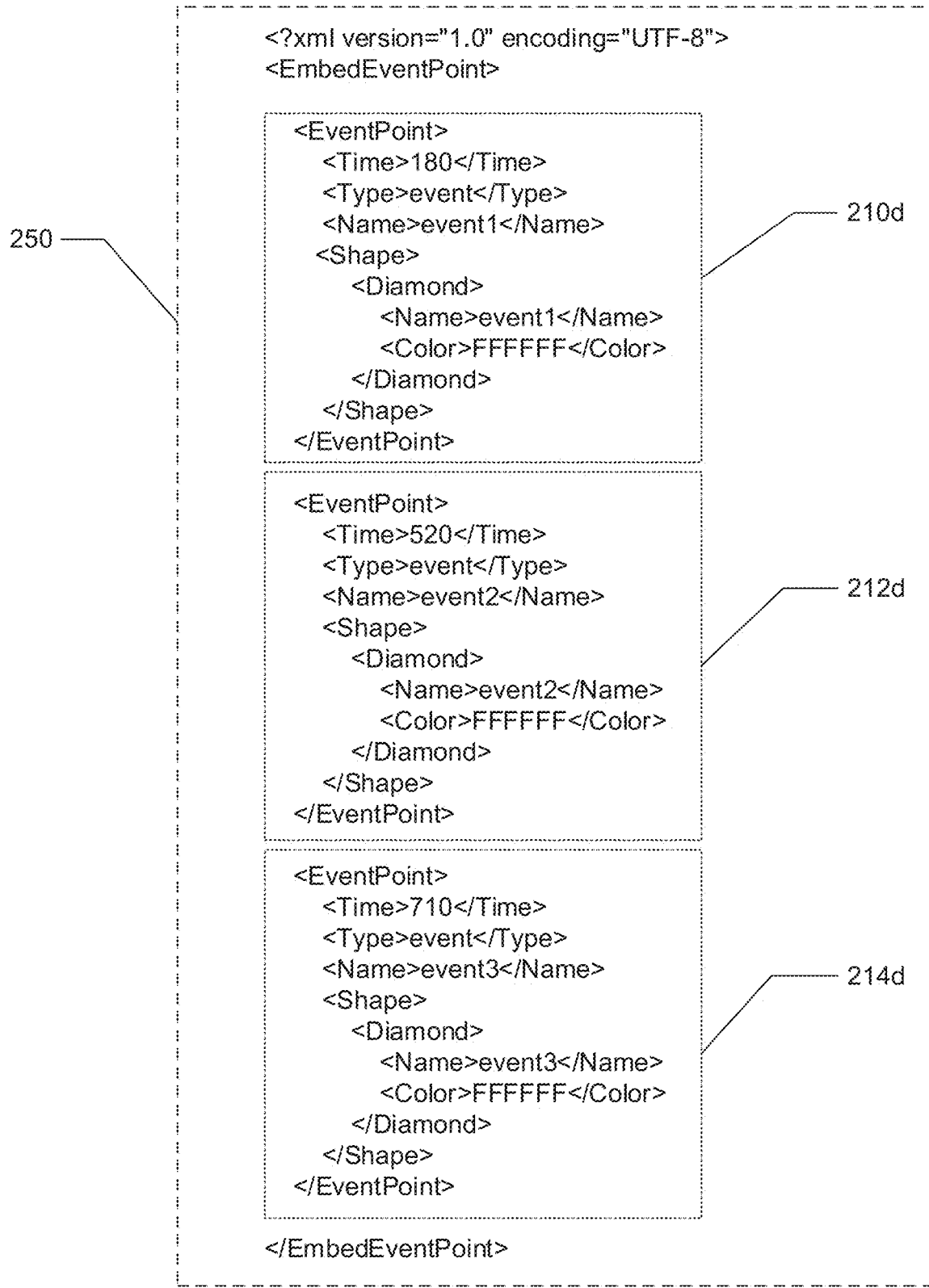
FIG. 2B is an example extensible markup language file for controlling the presence and location of event notifications associated with online media.

FIG. 2B illustrates example data 250 that controls the presence and/or location of the event notifications 210, 212, 214 depicted in the example FIG. 2A. A first block of data 210d controls the presence and location of the first example event notification 210 of FIG. 2A. In the illustrated example, the first block of data contains information regarding the placement of the advertisement. For example, first block 210d contains a time element (e.g., <Time>180</Time>). The time element denotes a time value in seconds (e.g., 180 seconds) from the start of the online media for the location of the first event notification 210 in the progress bar 208 of the example online media presentation 201. That is, the first event notification 210 will be placed at the one hundred and eighty (180) second mark in the example progress bar 208.

The first block 210d also contains data regarding the display of the first event notification 210. For example, the shape category denotes that the depiction of the event notification 210 is to be a diamond shape named "event 1" of a white color (e.g., hex-code color "FFFFFF").

Similarly, a second block of data 212d and a third block of data 214d control the presence and location of the second example event notification 212 and third example event notification 214 of FIG. 2A respectively. For example, the second block of data 212d denotes that the second event notification 212 is to be displayed as a white diamond at the five hundred and twenty second mark on the progress bar 208. As a further example, the third block of data 214d denotes that the third event notification 214 should be displayed as a white diamond at the seven hundred and ten second mark on the progress bar 208.

Figure 3:
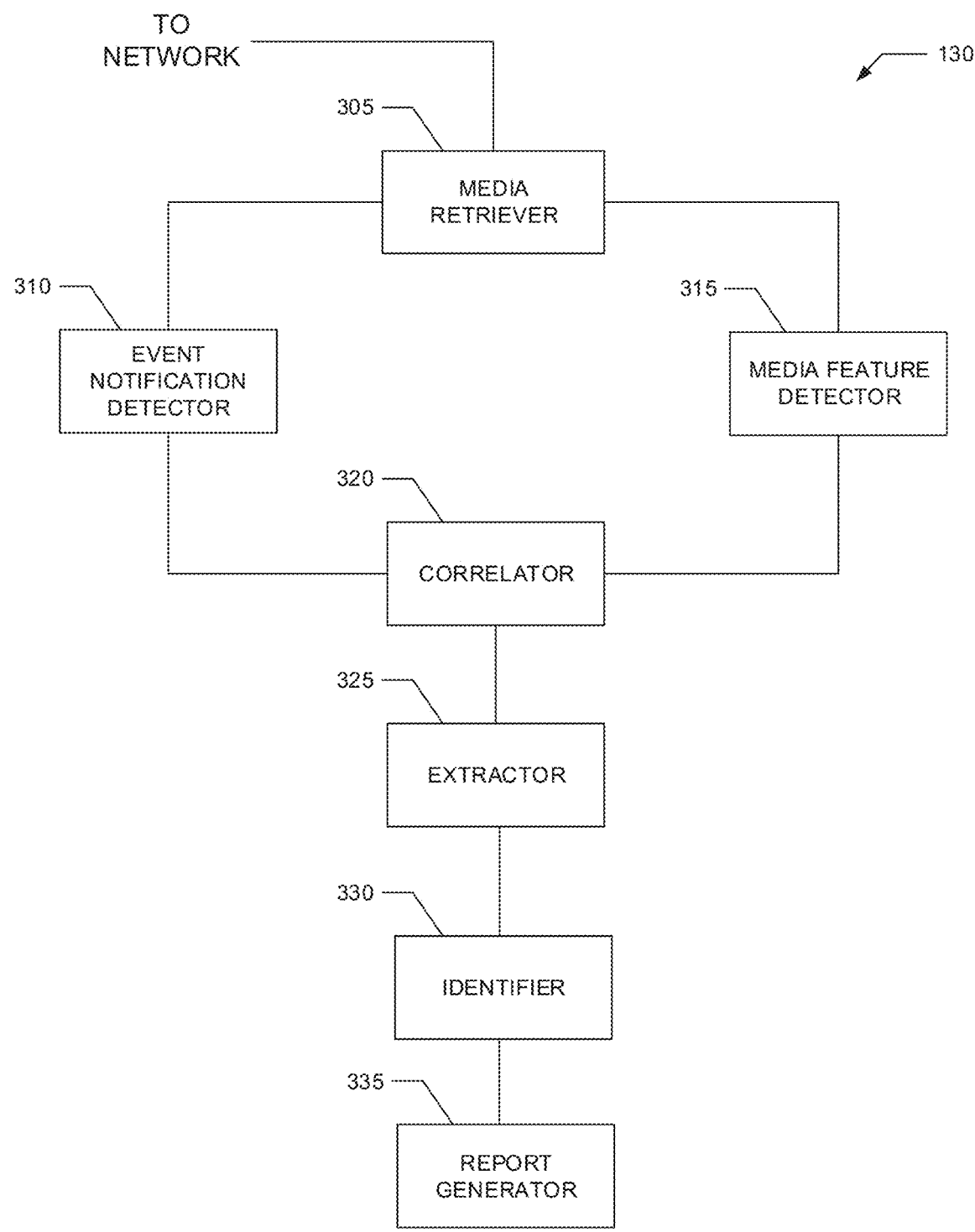
FIG. 3 is a block diagram of an example implementation of the advertisement crediting engine of FIG. 1 to credit advertisements in accordance with this disclosure.

FIG. 3 is a block diagram of an example implementation of the example advertisement detecting engine 130 of FIG. 1. The example advertisement detecting engine 130 of FIG. 3 is provided with an example media retriever 305, an example event notification detector 310, an example media feature detector 315, an example correlator 320, an example extractor 325, an example identifier 330, and an example report generator 335.

The example media retriever 305 of FIG. 3 accesses the URLs in a list of URLs to obtain the online media and/or data associated with the online media. For example, the list of URLs may contain URLs detected by a web crawling program used to validate hyperlinks associated with an online media provider (e.g., online media provider 120). In the example FIG. 3, the media retriever 305 is in communication with an example event notification detector 310 and an example media feature detector 315. The example media retriever 305 of the illustrated example acquires, downloads, and/or accesses data associated with the online media, such as, for example, auxiliary data. As used herein, auxiliary data refers to data contained in, or associated with, the online media and/or data contained in a URL associated with the online media. In some examples, such auxiliary data may be acquired from the web page associated with the URL (e.g., hyper-text markup language (HTML) and/or cascading style sheet (CSS) code). In other examples, such auxiliary data is contained in the online media and must be extracted. For example, the auxiliary data may include the data controlling the presence and/or location of event notifications. Such auxiliary data may be contained in a container file such as a flash video file (e.g., an ".flv" file). Thus, the container file must be unpackaged and/or decoded by the media retriever 305 in order to acquire the auxiliary data. The example media retriever 305 transmits the auxiliary data to the example event notification detector 310.

Because online media may include randomly inserted and/or rotating advertisements, the example media retriever 305 may acquire, access, and/or download the online media file multiple times so that the example media feature detector 315 may detect the majority of advertisements associated with the online media. The example media retriever 305 transmits the retrieved online media file to the example media feature detector 315 upon each acquisition, access, and/or download in the event that the lengths and/or positions of the advertisements change from one acquisition, access, and/or download to the next.

The example event notification detector 310 of the illustrated example of FIG. 3 analyzes the auxiliary data extracted by the example media retriever 305 to determine the presence and/or location of event notifications (e.g., by analyzing data controlling the presence and/or location of event notifications such as the example data illustrated in FIG. 2B). For example, the event notification detector 310 may analyze the auxiliary data for data controlling the presence and/or location of event notifications such as metadata, variables, and/or strings indicative of event notifications in a progress bar and/or secondary media acquisitions.

In some examples, when the example event notification detector 310 determines that the temporal location of the event notifications with respect to the online media file and/or the progress bar are not accessible in the auxiliary data (e.g., the data is encrypted or otherwise not accessible by the event notification detector 310), the event notification detector 310 determines a temporal location of the event notifications by analyzing the relative location of the event notifications displayed on the progress bar while the online media is presented. For example, the event notification detector 310 may render the presentation of the online media to detect the depiction of the progress bar and determine its length in pixels (or any other unit of measurement). The event notification detector 310 can also detect anomalies indicative of event notifications in the depiction of the progress bar (e.g., shapes, varying colors, and/or overlays). This detection may be performed using image and/or video recognition and detection techniques. The event notification detector 310 can determine a temporal location of the event notifications with respect to the online media using Equation 1.

Regardless of the method of detecting the event notifications, the temporal location(s) of the event notifications are transmitted to the example correlator 320 by the example event notification detector 310.

The example media feature detector 315 obtains the online media file downloaded by the example media retriever 305. In the illustrated example, the example media feature detector 315 is in communication with the example media retriever 305 and the example correlator 320. The online media file is analyzed for media features by the example media feature detector 315. Example media features detected by the example media feature detector 315 that may be indicative of an advertisement include blank frames, audio silence, dramatic volume shifts, etc. When a media is detected, the temporal location of the detected media feature is recorded by the example media feature detector 315. As explained above, the detected media features may be used in concert with the detected event notifications to determine the start of advertisements embedded in the online media, and may further be used to detect the end of the advertisements. The temporal locations of the detected media features are transmitted to the example correlator 320.

The example media feature detector 315 also tracks the duration of the primary media and the total online media presentation. That is, in some instances, the duration of the primary media presented in an online media presentation may be three minutes. However, with the incorporation of three thirty-second advertisements into the online media presentation, the duration of the online media presentation would be four minutes and thirty seconds. These durations are used by the example correlator 320 to validate the detected advertisements as explained in further detail below.

The example correlator 320 obtains the temporal locations of the event notifications determined by the example event notification detector 310 and the temporal locations of the media features determined by the example media feature detector 315 and determines temporal locations where event notifications and media features closely correspond. The example correlator 320 of the illustrated example FIG. 3 is in communication with the example event notification detector 310, the example media feature detector 315 and the example extractor 325.

In the illustrated example, the example correlator 320 uses the temporal locations of the event notifications as guideposts. That is, the event notifications are used as the primary indicator of a presence of an advertisement and the temporal locations of the media features are compared to the temporal locations of the event notifications. Alternatively, the temporal locations of the media features can be used as the guideposts and the temporal locations of the event notifications may be compared to the temporal locations of the media features. Temporal locations where event notifications and media features closely correspond (e.g., match, correlate, align, etc.) are detected when a comparison to a guidepost is within a window of time from the guidepost (e.g., a window of +/- identified, which correspond to starting times of advertisements, are stored by the example correlator 320 and/or transmitted to the example extractor 325.

The example correlator 320 also detects end times of advertisements. For example, the example correlator 320 searches for media features at suspected advertisement durations from the matching temporal locations determined as advertisement start times. As explained above, online advertisements generally have 15, 30, or 45 second durations. Accordingly, the example correlator 320 searches for media features at suspected advertisement durations from the detected advertisement start. When a media feature is detected at a suspected advertisement end time, the example correlator 320 designates this time and/or temporal location as the end of the detected advertisement. The end times of the detected advertisements are stored by the example correlator 320 and/or transmitted to the example extractor 325.

The example correlator 320 also determines if the durations (e.g., the span from detected start to detected end time) of the detected advertisements are valid. For example, if the duration of the primary media determined by the example correlator 320 is three minutes and the duration of the online media presentation determined by the example correlator 320 is four minutes, the correlator 320 determines that one minute of advertising time occurred during the online media presentation (e.g., the one minute of advertisements extended the play time from three minutes of media to four minutes of total play time). Thus, if the correlator 320 detected two advertisements of thirty second durations, the duration of the total advertisements is equal to the advertising time determined by the example correlator 320. However, if the total duration of the detected advertisements is not equal to the advertising time determined by the example correlator 320, the example correlator 320 produces an error message and repeats the method to detect advertisements in the online media.

The example extractor 325 obtains the determined start and end times of detected advertisements and extracts a portion of the online media, the portion starting from the matching temporal location determined by the example correlator 320 and ending at the detected end time. In the illustrated example, the example extractor 325 is in communication with the example correlator 320 and the example identifier 330. The example extractor 325 utilizes a media editing suite of algorithms for extracting the corresponding portion of the online media file. Alternatively, the example extractor 325 may record excerpts of the online media in lieu of actual extraction of the advertisement. In the illustrated example, the example extractor 325 extracts a portion of the online media from the determined start time of the advertisement to the determined end time of the advertisement. The extracted advertisement ensures that enough media is obtained to properly identify the advertisement using one of watermarking and/or signatures embedded in the advertisement. To this end, the extracted portions of the online media file are transmitted to the example identifier 330 for identification.

The example identifier 330 obtains the extracted portions of the online media file (e.g., potential advertisements) and analyzes the extracted portions to identify the advertisements using watermarks and/or signatures. The example identifier 330 of FIG. 3 is in communication with the example extractor 325 and the example report generator 335. In the illustrated example, the example identifier 330 analyzes the extracted portions for Nielsen® codes. Alternatively, however, any watermarking, signature, image, audio, and/or metadata analysis may be performed by the example identifier 330 to identify the advertisement in the extracted portion of the online media file. When the advertisement in the extracted portion is identified, the example identifier 330 stores the identified advertisement as associated with and/or presented by the online media.

The example report generator 335 stores and/or transmits the identified advertisements and/or associated online media to a data collection facility located at and/or remote from, the audience measurement entity 125. In some examples, the example report generator 335 may perform other actions in response to identifying advertisements, such as, providing real-time reports of detected advertisements. In other examples, the report generator 335 may generate reports of all online media associated with a particular one or group of advertisements.

While an example manner of implementing the example advertisement detecting engine 130 of FIG. 1 is illustrated in FIG. 3, one or more of the elements, processes and/or devices illustrated in FIG. 3 may be combined, divided, re-arranged, omitted, eliminated and/or implemented in any other way. Further, the example media retriever 305, the example event notification detector 310, the example media feature detector 315, the example correlator 320, the example extractor 325, the example identifier 330, the example report generator 335, and/or, more generally, the example advertisement detecting engine 130 of FIG. 1 may be implemented by hardware, software, firmware and/or any combination of hardware, software and/or firmware. Thus, for example, any of the example media retriever 305, the example event notification detector 310, the example media feature detector 315, the example correlator 320, the example extractor 325, the example identifier 330, the example report generator 335, and/or, more generally, the example advertisement detecting engine 130 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, media retriever 305, the example event notification detector 310, the example media feature detector 315, the example correlator 320, the example extractor 325, the example identifier 330, or the example report generator 335 is/are hereby expressly defined to include a tangible computer readable storage device or storage disk such as a memory, a digital versatile disk (DVD), a compact disk (CD), a Blu-ray disk, etc. storing the software and/or firmware. Further still, the example advertisement detecting engine 130 of FIG. 1 may include one or more elements, processes and/or devices in addition to, or instead of, those illustrated in FIG. 3, and/or may include more than one of any or all of the illustrated elements, processes and devices.

Flowcharts representative of example machine readable instructions for implementing the advertisement detecting engine 130 of FIG. 1 are shown in FIGS. 4, 5, 6, 7, 8, 9, and 10. In these examples, the machine readable instructions comprise a program for execution by a processor such as the processor 1112 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 4, 5, 6, 7, 8, 9, and 10, many other methods of implementing the example advertisement detecting engine 130 of FIG. 1 may alternatively be used. For example, the order of execution of the blocks may be changed, and/or some of the blocks described may be changed, eliminated, or combined.

As mentioned above, the example processes of FIGS. 4, 5, 6, 7, 8, 9, and 10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4, 5, 6, 7, 8, 9, and 10 may be implemented using coded instructions (e.g., computer and/or machine readable instructions) stored on a nontransitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 4:
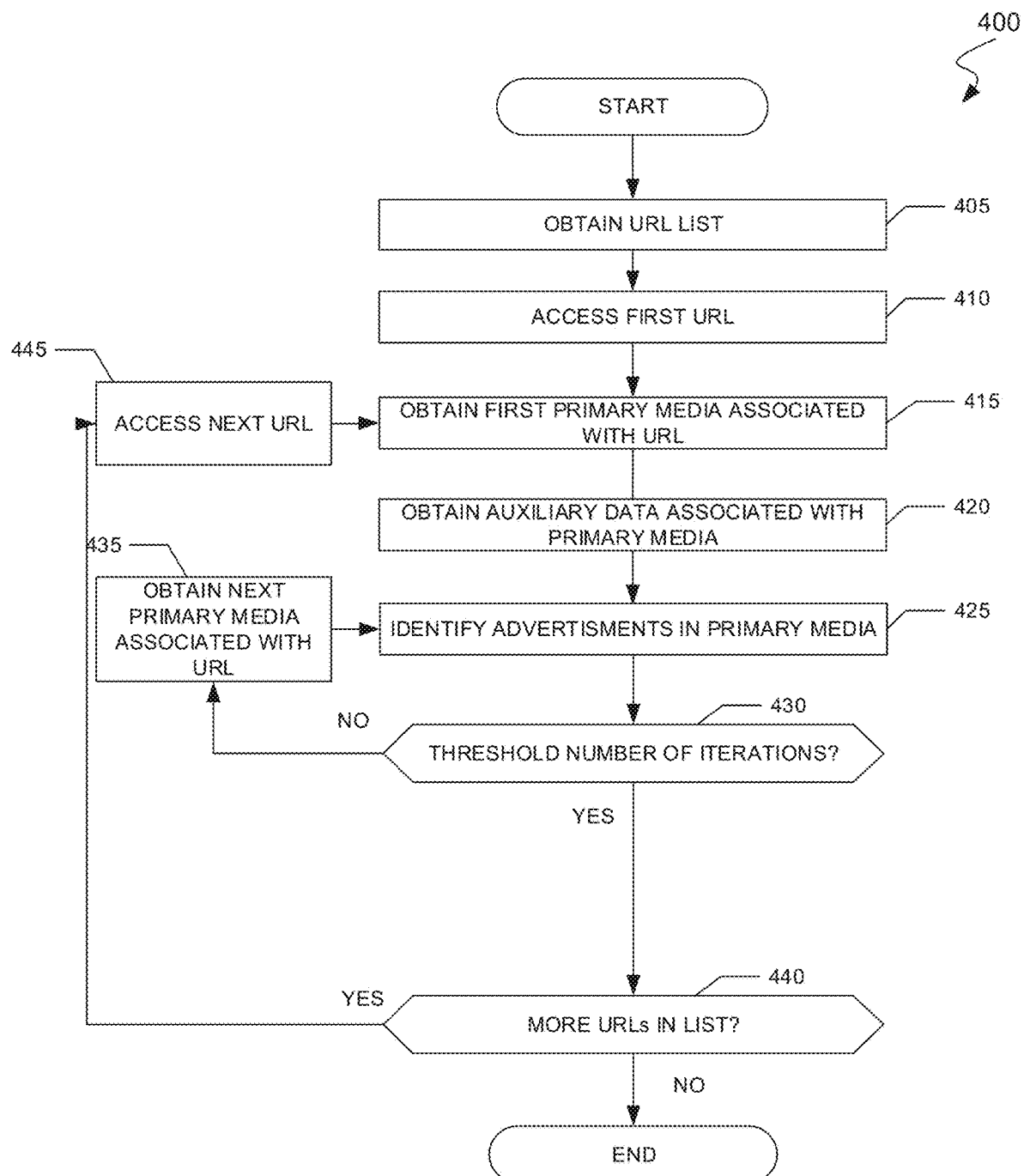
FIG. 4 is a flowchart representative of example machine readable instructions that may be executed to implement the example advertisement crediting engine of FIGS. 1 and/or 3 to credit advertisements.

FIG. 4 is a flowchart representative of example machine readable instructions that may be executed to implement the example advertisement detecting engine 130 of FIG. 1. The example program 400 may be initiated, for example, when a list of URLs for online media is obtained by the advertisement detecting engine 130, or more specifically, the media retriever 305 from the example online media provider 120 (block 405).

The example media retriever 305 accesses a first URL indicated in the list of URLs via a network (e.g., the example network 115 of FIG. 1) (block 410). The example media retriever 305 acquires, downloads, and/or accesses the primary media (e.g., the online media) associated with the URL accessed at block 410 (block 415). In some examples, the example media retriever 305 determines an address, location, etc. of the primary media associated with the URL from data retrieved at the URL and acquires, downloads, and/or accesses the primary media via the network. Alternatively, the media retriever 305 may generate a recording of the primary media if acquiring, downloading, and/or accessing of the primary media fails and/or the primary media is unavailable for download (e.g., due to restrictions imposed by the example online media provider 120). The example media retriever 305 then obtains auxiliary data associated with the primary media (block 420).

The advertisement detecting engine 130 then identifies advertisements included in (e.g., embedded in) the primary media (block 425). Example methods to identify the media are discussed in conjunction with FIGS. 5, 6, 7, 8, 9, and 10. When the advertisements are detected in the primary media by the example advertisement detecting engine 130, the example media retriever 305 determines if the primary media has been accessed a sufficient number of times to detect the rotating advertisements presented in conjunction with the primary media. For example, the media retriever 305 may determine if no previously unseen advertisements are identified for a threshold number of retrievals. If the primary media has not been acquired, downloaded, and/or accessed a sufficient number of times, control proceeds to block 435. However, if at block 430, the media retriever 305 determines that the primary media has been acquired, downloaded, and/or accessed a sufficient number of times to detect the advertisements associated with the primary media, control proceeds to block 440.

If the example media retriever 305 determines that the online media has not been retrieved a sufficient number of times (block 430), the media retriever 305 obtains the primary media associated with the URL once again so that advertisements may be detected from the primary media (block 435). Control returns to block 425 to identify advertisement(s) embedded in the retrieved online media.

At block 440, the example media retriever 305 determines if more URLs remain in the list of URLs for advertisement detection. If more URLs remain, control proceeds to block 445 where the example media retriever 305 accesses the next URL. However, if no more URLs remain to be accessed, control terminates and/or suspends until such time that a new list of URLs is provided to the example advertisement detecting engine 130. For example, a further scan by a robot and/or web crawler may reveal online media that has not previously been analyzed to identify advertisements. Alternatively, the example online media provider 120 may send a list of URLs (e.g., newly added URLs) to the audience measurement entity 125.

Figure 5:
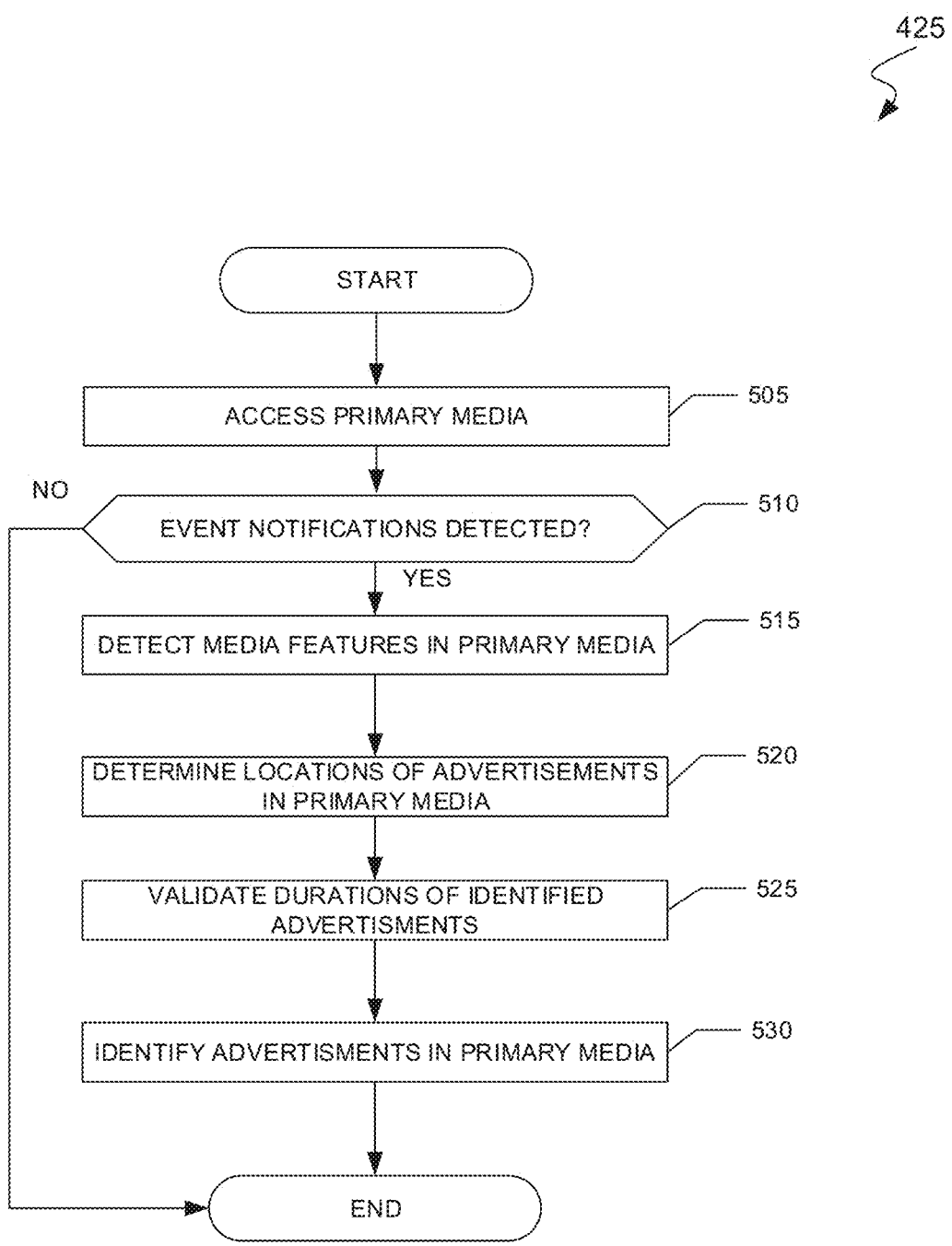
FIG. 5 is a flowchart representative of example machine readable instructions that may be executed to implement the example advertisement crediting engine of FIGS. 1 and/or 3 to credit advertisements.

FIG. 5 is a flowchart representative of example machine readable instructions that may be executed to implement block 425 of example FIG. 4 to identify advertisements included in (e.g., embedded in) the primary media. The example instructions begin when primary media and auxiliary data are obtained by the example media retriever 305 so that advertisements may be detected in online media.

The event notification detector 310 accesses the acquired, downloaded, and/or accessed auxiliary data and/or the accessed primary media so that media features may be detected (block 505). The example event notification detector 310 of the illustrated example FIG. 5 analyzes the obtained auxiliary data using string searching (e.g., using known strings that denote event notifications) to locate data directing the presence and/or location of the event notifications (e.g., visible marks, icons, graphical overlays, and/or encoded event notifications not visible on a rendered webpage) (block 510).

In some examples, where auxiliary data is not accessible and/or is not available, the event notification detector 310 may detect event notifications by rendering the online media presentation and detecting event notifications through image recognition techniques. The event notification detector 310 can detect the depiction of the progress bar in the rendered online media presentation through heuristic training and/or image recognition techniques and determine the length of the progress bar in pixels. The event notification detector 310 also detects graphical indicators indicative of event notifications in the depiction of the progress bar using the heuristic training and/or image recognition techniques (e.g., shapes, colors, and/or overlays).

If event notifications are detected in the auxiliary data by the example event notification detector 310, the example event notification detector 310 proceeds with detecting the event notifications. An example method for detecting event notifications is described in conjunction with FIG. 6.

In the illustrated example FIG. 5, if no event notifications are detected in the auxiliary data by the event notification detector 310, the example instructions terminate. However, in some examples, the instructions do not terminate when no event notifications are detected. Instead, the instructions may proceed to block 515 and continue to attempt to detect advertisements in the online media using only detected media features. For example, the online media may be analyzed at the location of media features to determine if the media is a known advertisement (e.g., by analyzing a code or signature extracted (or generated) from the online media after a media feature).

At block 515, the example media feature detector 315 analyzes the acquired, downloaded, and/or accessed primary media to identify media features such as blank frames, audio silence, dramatic volume shifts, etc. (block 515). An example method to identify media features is described in conjunction with FIG. 7.

The example correlator 320 detects the locations and/or durations of the advertisements in the primary media based on the event notifications and the media features (block 520). An example method to determine advertisement locations is described in conjunction with FIG. 8. When the advertisements have been detected by the example correlator 320, the example correlator 320 validates the duration of the detected advertisements using the duration of the primary media and the duration of the online media presentation as determined by the example media retriever 305 (block 525). An example method to validate advertisement locations is described in conjunction with FIG. 9. When the detected advertisements are validated, the example identifier 330 determines the identity of the advertisements (block 530). An example method to determine the identity of advertisements is described in conjunction with FIG. 10. When the advertisements have been identified by the example identifier 330, the process of FIG. 5 ends. For example, control may return to block 430.

Figure 6:
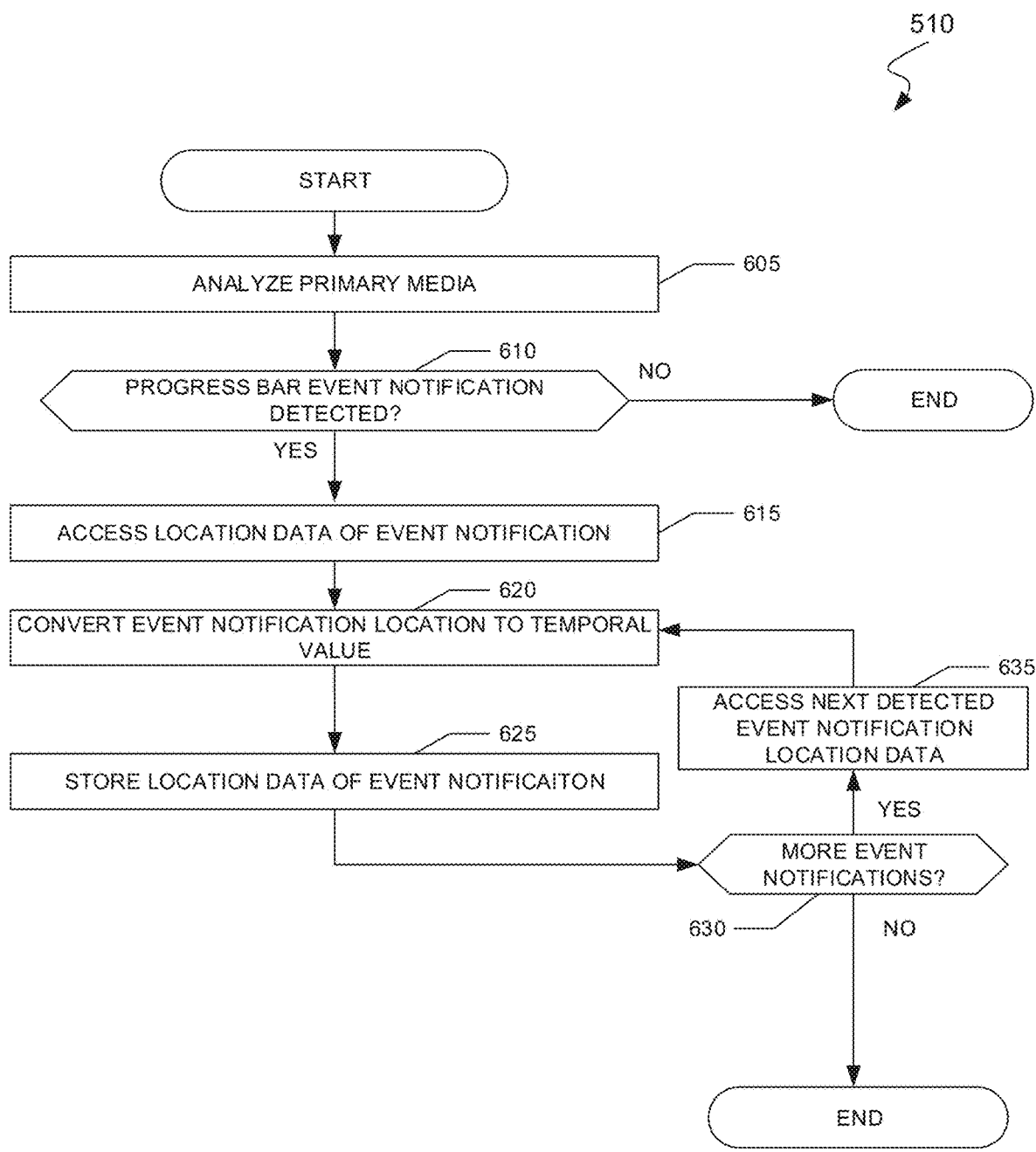
FIGS. 6-10 are flowcharts representative of example machine readable instructions that may be executed to implement the example advertisement detecting engine 130 of FIG. 1.

FIG. 6 is a flowchart representative of example machine readable instructions that may be executed to implement block 512 of example FIG. 5. The example instructions begin when control arrives at block 512 of example FIG. 5.

As explained above, the event notification detector 310 analyzes the auxiliary data using string searching for indications of data directing the presence and/or location of the event notifications (e.g., visible marks, icons, graphical overlays, and/or encoded event notifications not visible on a rendered webpage) (block 605 and block 610). The event notification detector 310 accesses the data directing the presence and/or location of the first event notification to determine the location of the event notification (block 615). In some examples, the data directing the presence and/or location of the event notification contains a temporal location of the event notification that is accessible by the event notification detector 310. In other examples, the event notification detector 310 determines, using image recognition, that a graphical indicator of an event notification is in a progress bar of the online media presentation. In such examples, at block 615, the event notification detector 310 determines the location of the graphical indicator of the event notification is within the progress bar.

At block 620, the example event notification detector 310 converts the location of the event notification to a temporal location with respect to the duration of the primary media using Equation 1 provided above. Alternatively, where the temporal location of the event notification is indicated directly by the auxiliary data, it may not be necessary to calculate the temporal location using Equation 1. The event notification detector 310 stores, caches, and/or archives the temporal location of the event notification for later use by the example correlator 320 (block 625). At block 630, the example event notification detector 310 analyzes the auxiliary data to determine if there are additional event notifications. If another event notification is detected in the auxiliary data, the next event notification is accessed (block 635) and control returns to block 620 to analyze the next event notification. If no more event notifications are detected in the auxiliary data, the process of FIG. 6 ends. For example, control may return to block 515 of FIG. 5.

Figure 7:
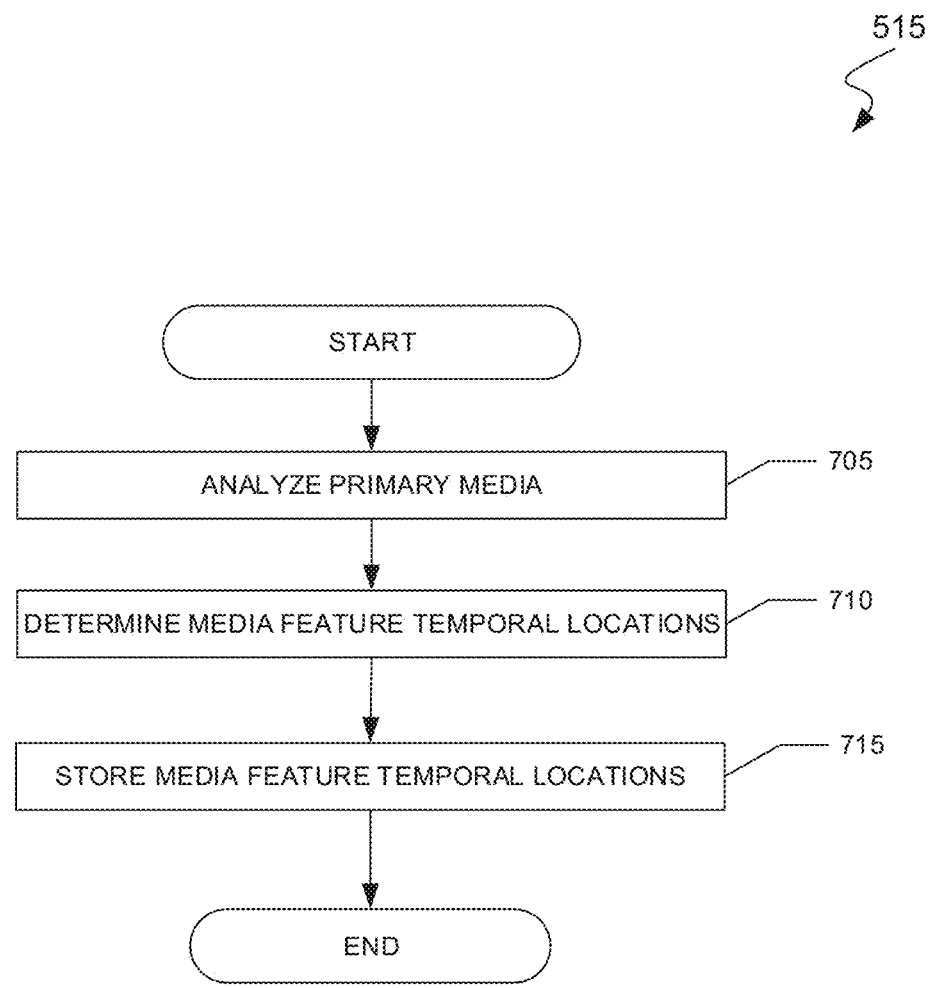

FIG. 7 is a flowchart representative of example machine readable instructions that may be executed to determine media feature locations. For example, the process of FIG. 7 may be used to implement block 515 of example FIG. 5.

At block 705, the media feature detector 315 analyzes the primary media to detect media features of the primary media. For example, at block 705, media features such as blank frames, audio silence, dramatic volume shifts, or other features that are indicative of a change in media (e.g., a transition that may indicate the start of an embedded advertisement) may be detected in the primary media. In some examples, the media feature detector 315 may be configured to only search for media features in temporal locations around event notifications. For example, if an event notification is detected at 75 seconds into the primary media, the media feature detector 320 may search for media features located between one second before or one second after the event notification. The media feature detector may further search for additional media features located one second before or one second after suspected advertisement durations from the event notification. That is, the media feature detector may search for an end of the advertisement at 15 seconds from the event notification (90 seconds of the total duration), 30 seconds from the event notification (105 seconds of the total duration), 45 seconds from the event notification (120 seconds of the total duration), etc. so that media features indicative of the end of the advertisement may be detected.

When the primary media has been analyzed, the example media feature detector 315 determines the temporal locations and/or times at which the media features occurred (block 710). The example media feature detector 315 stores, caches, and/or archives the temporal location of the media features for later use by the example correlator 320 (block 715). When the temporal locations of the media features have been stored, the process of FIG. 7 ends. For example, control may return to block 520 of FIG. 5.

Figure 8:
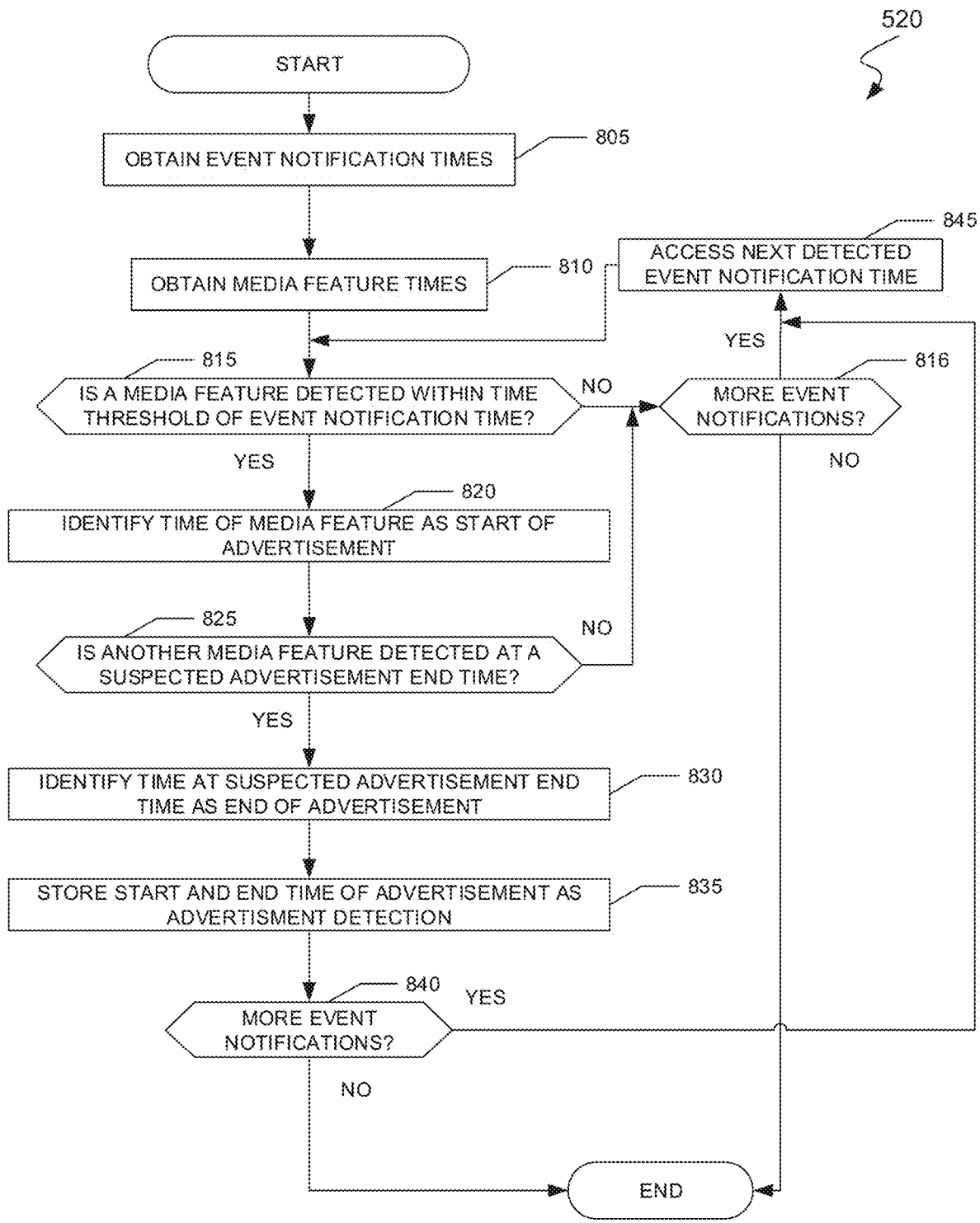

FIG. 8 is a flowchart representative of example machine readable instructions that may be executed to determine locations of advertisements in online media. For example, the process of FIG. 8 may be used to implement block 520 of example FIG. 5.

The example correlator 320 obtains temporal locations of event notifications from the example event notification detector 310 (block 805). The example correlator 320 also obtains temporal locations of media features from the example media feature detector 315 (block 810). At block 815, the example correlator 320 compares the temporal locations of the event notifications to the temporal locations of the detected media features to identify temporal locations where an event notification and a detected media feature are within a threshold amount of time (e.g., less than or equal to one second apart) (block 815). If the example correlator 320 determines that a temporal location of a media feature is within the threshold time from the temporal location of an event notification, the temporal location of the media feature is identified as an advertisement start location (block 820). In some examples, instead of identifying the temporal location of the media feature as the advertisement start location, the example correlator 320 may alternatively identify the corresponding event notification temporal location as the advertisement start location at block 820.

If no match is detected for a given event notification, the example correlator 320 proceeds to determine if another event notification (e.g., event notification time) is to be used to detect advertisements (block 816). If another event notification time is detected by the example correlator 320, the example correlator 320 accesses the next event notification time (block 845) and control returns to block 815. If no other event notification time is detected by the example correlator 320, the process of FIG. 8 ends. For example, control may return to block 525 of FIG. 5.

Returning to block 820, when the example correlator 320 determines the start time of the advertisement, control proceeds to block 825. At block 825, the example correlator 320 searches for a temporal location of a media feature (and/or media feature) at suspected end times of advertisements. For example, the example correlator 320 will look for a temporal locations of a media feature (and/or media feature) detected 15 seconds, 30 seconds, 45 seconds, etc. from the identified start time of the advertisement. If the example correlator 320 does not detect a temporal location of a media feature (and/or media feature) at a suspected advertisement end time, control proceeds to block 816 where the example correlator determines if more event notifications are detected.

In some examples, at block 825, if a temporal location of a media feature (and/or media feature) is not detected at a suspected advertisement end time, the example correlator 320 may be configured to create an advertisement end time at a specific duration from the detected start time. For example, if the minimum duration of advertisements are known (e.g., 15 seconds) then creating an advertisement end time 15 seconds from the identified start time may ensure that at least a portion of the advertisement may be extracted and identified by the example extractor 325 and the example identifier 330.

If a temporal location of a media feature (and/or media feature) is detected at a suspected advertisement end time in block 825, the example correlator 320 identifies the temporal location of the media feature as the end time of the advertisement (block 830). The example correlator 320 then stores the identified start and end times of the advertisement (block 835). The example correlator 320 proceeds to determine if another event notification (e.g., event notification time) is to be used to detect advertisements (block 840). If another event notification time is detected by the example correlator 320, the example correlator 320 accesses the next event notification time (block 845). If no other event notification time is detected by the example correlator 320, the process of FIG. 8 ends. For example, control may return to block 525 of FIG. 5.

Figure 9:
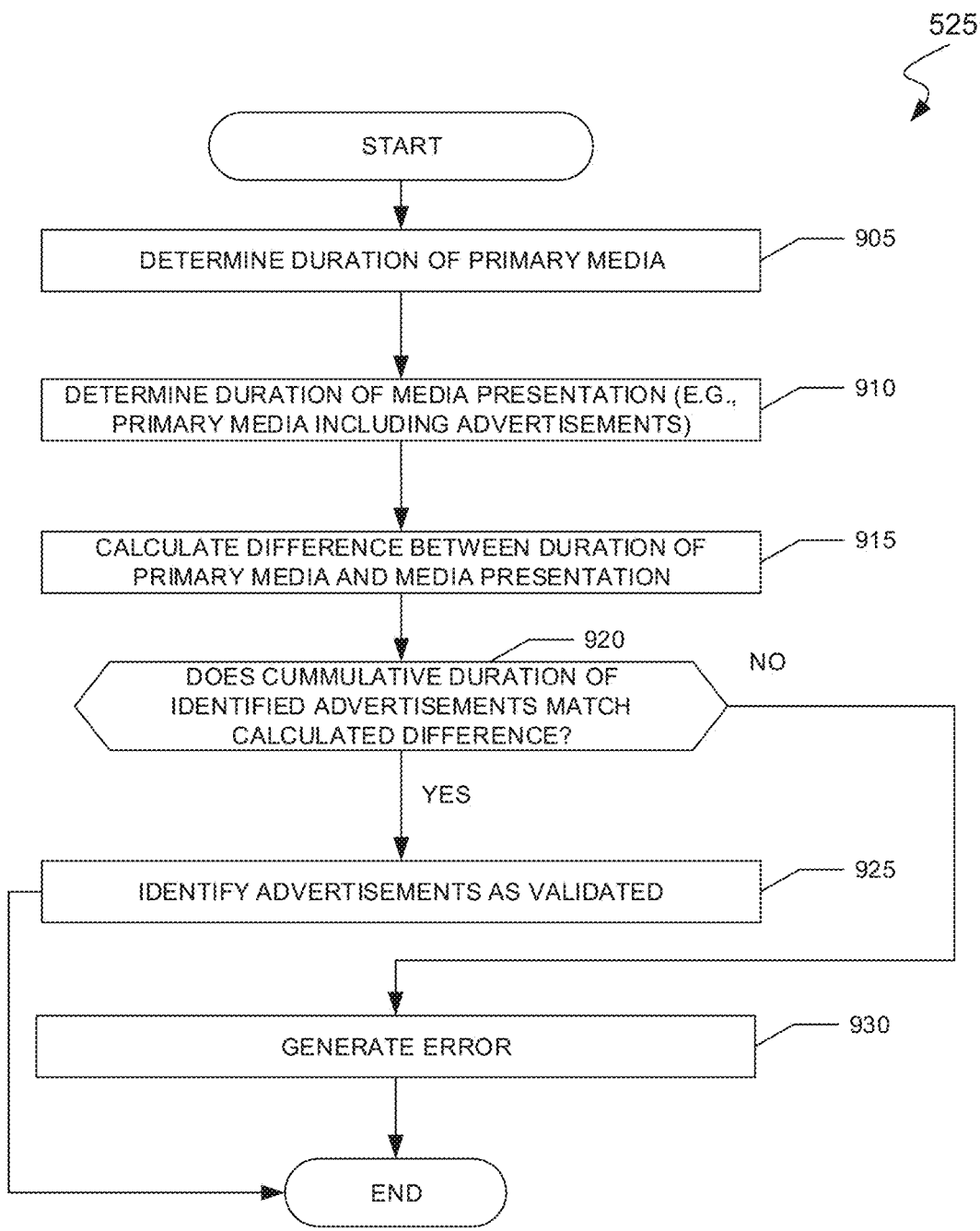

FIG. 9 is a flowchart representative of example machine readable instructions that may be executed to validate the durations of advertisements detected in the online media. For example, the process of FIG. 9 may be used to implement block 525 of example FIG. 5.

The example event notification detector 310 determines the duration of the primary media (e.g., the duration without embedded advertisements) from the auxiliary data by searching for data denoting the duration of the primary media (block 905). Alternatively, in some examples, the media retriever 305 may determine the duration of the primary media when the primary media is obtained (e.g., at block 415 of FIG. 4).

The media feature detector 315 also determines the duration of the online media presentation (block 910). For example, the duration of the online media presentation is the combined duration of the primary media and the advertisements. For example, the media feature detector 315 may determine the duration of the online media presentation by tracking the duration of the presentation during processing.

The example correlator 320 determines the difference of time between the duration of the primary media and the duration of the online media presentation to determine the total duration of embedded advertisements (block 915).

The example correlator 320 compares the total duration calculated at block 915 to the duration of all the advertisements detected in block 525 (e.g., FIG. 8) (block 920). If the duration of the detected advertisements in FIG. 8 is equal or approximately equal (e.g., within five seconds, within 5% of the total length, etc.) to the difference between the duration of the primary media and the duration of the online media presentation, the example correlator 320 declares and/or marks the detected advertisements as validated (block 925).

If the total duration of the detected advertisements and the calculated total duration are not equal or within a margin of error, the example correlator 930 generates an error (block 930). In some examples, such an error message may cause the advertisement detecting engine 130 to repeat the process of detecting advertisements and/or detecting one of media features and/or event notifications.

When the example correlator 320 has validated and/or produced an error, the process of FIG. 9 ends. For example, control may return to block 530 of FIG. 5.

Figure 10:
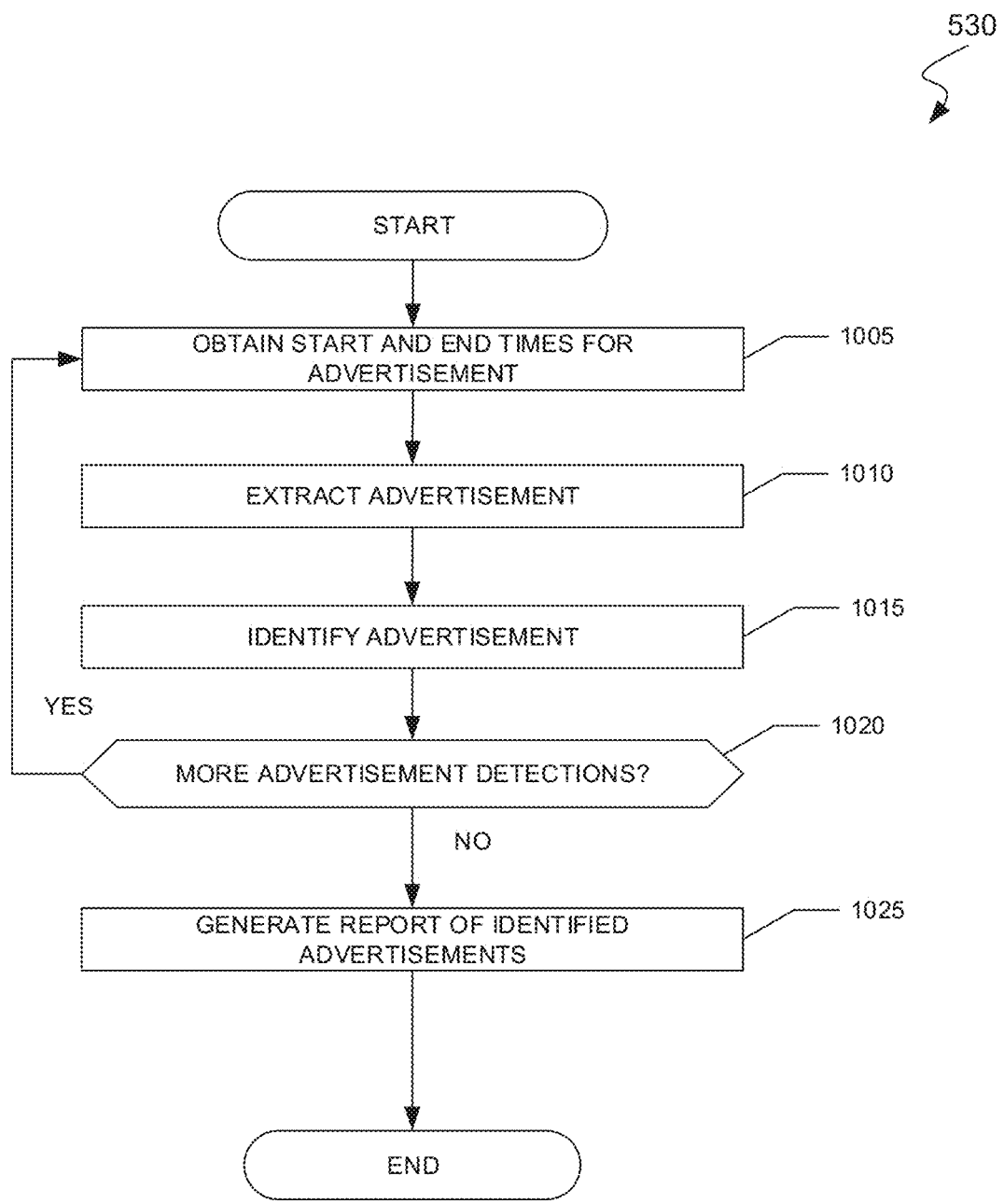

FIG. 10 is a flowchart representative of example machine readable instructions that may be executed to identify advertisements detected in online media. For example, the process of FIG. 10 may be used to implement block 530 of example FIG. 5.

The example extractor 325 obtains the validated start and end times for an advertisement determined by the example correlator 320 (e.g., the start and end time determined at block 520 and/or the process of FIG. 8) (block 1005). The example extractor 325 extracts a portion of the primary media that starts at the obtained start time and ends at the end time (block 1010). In some examples, the example extractor 325 may use video editing algorithms to perform such extraction. In other examples, the example extractor 325 may record and/or copy the portion of the primary media and store the recording and/or the copy as the detected advertisement.

The example identifier 330 obtains the extracted, recorded, and/or copied portion of the primary media and identifies the advertisement using one of audio watermarks, signatures, and/or image recognition techniques (block 1020). Alternatively, any other process for identifying media may be used. The example identifier 330 stores the identified advertisement as presented by and/or associated with the primary media. In some examples, the example identifier 330 also stores and/or associates a cookie or other identifier used by the advertisement detecting engine 130 when obtaining the primary media. For example, the cookie or other identifier may correspond to a user and/or profile representing a specific demographic. Storing and/or associating the cookie or other identifier used to obtain the primary media allows the advertisement detecting engine 130 to determine which advertisements are detected in association with a specific demographic.

The example extractor 325 determines if more advertisements are to be identified (block 1020). For example, the example extractor 325 may determine if more advertisements were detected by the example correlator 320. If more advertisements were detected, control proceeds to block 1005. If no more advertisements were detected from the primary media, the example report generator 335 generates a report of the identified advertisements. In some examples, the report generator 335 generates a report of advertisements presented by demographic. For example, some advertisements are targeted and/or served to specific demographics by an online media provider 120. Using the cookie or other identifier associated with the detected advertisement, a report may be generated according to demographics. For example, a report of advertisements served to the Male aged 18-34 demographic would include information associated with advertisements detected by the advertisement detecting engine 130 while using a cookie or other identifier corresponding to a Male aged 18-34. In other examples, the report generator 335 stores, in a database, identified advertisements as associated with and/or presented in conjunction with a corresponding primary media. For example, the identified advertisements may be stored as associated with a show, with a particular episode of a show, a genre of shows, and/or an online media provider (e.g., online media provider 120 of FIG. 1). For example, the report generator 335 may store a list of advertisements that were detected over multiple retrievals of the online media.

Figure 11:
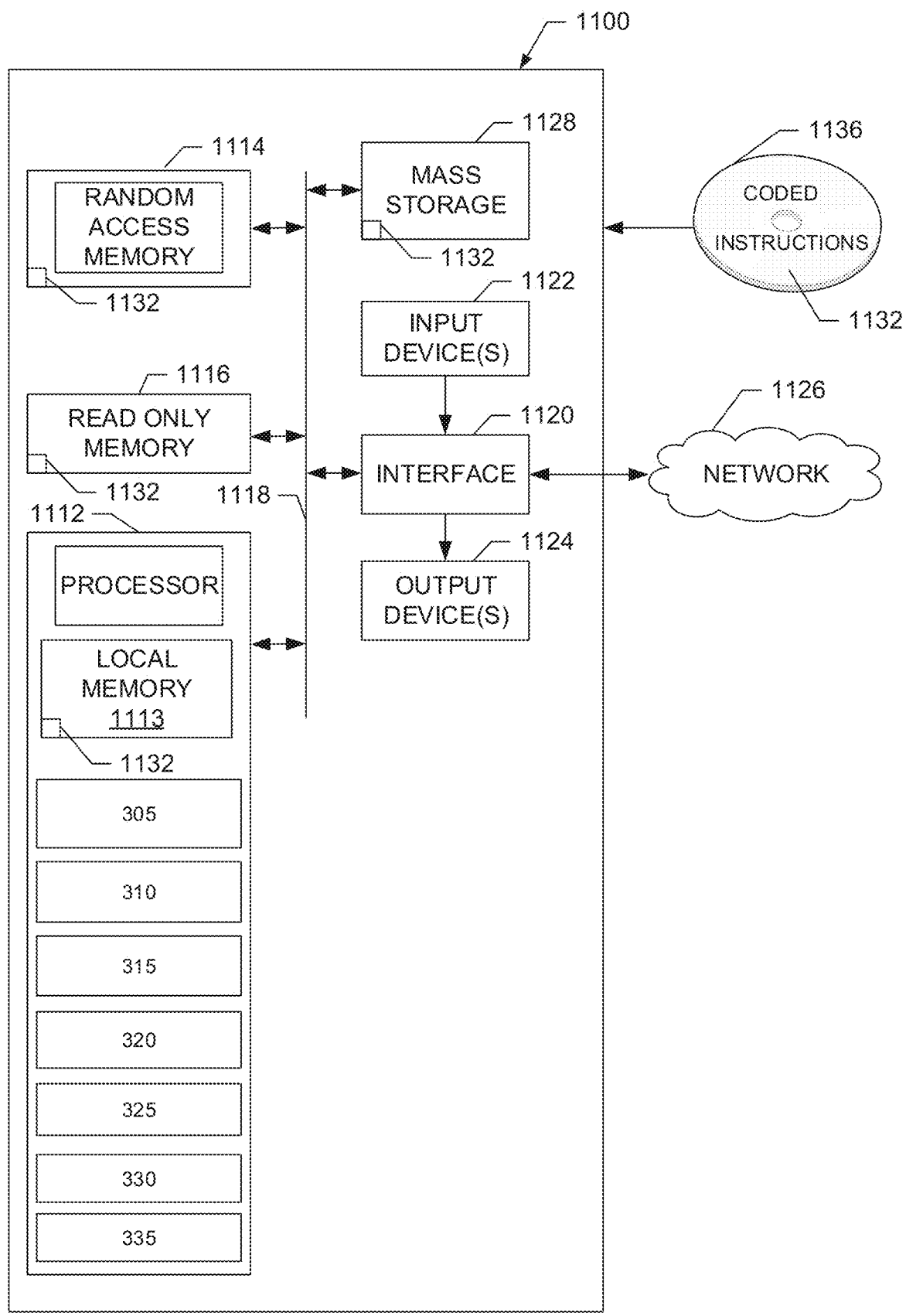
FIG. 11 is a block diagram of an example processor platform structured to execute the instructions of FIGS. 4, 5, 6, 7, 8, 9, and/or 10 to implement the advertisement detecting engine of FIG. 1.

FIG. 11 is a block diagram of an example processor platform 1100 capable of executing the instructions of FIGS. 4, 5, 6, 7, 8, 9, and 10 to implement the application detecting engine 130 of FIG. 1. The processor platform 1100 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The processor platform 1100 also includes the example media retriever 305, the example event notification detector 310, the example media feature detector 315, the example correlator 320, the example extractor 325, the example identifier 330, and the example report generator 335.

The coded instructions 1132 of FIGS. 4, 5, 6, 7, 8, 9, and 10 may be stored in the mass storage device 1128, in the volatile memory 1114, in the non-volatile memory 1116, and/or on a removable tangible computer readable storage medium such as a CD or DVD 1136.

From the foregoing, it will be appreciated that the above disclosed methods and apparatus detect advertisements embedded in online media. Additionally, the disclosed examples provide for the ability to detect advertisements embedded in online media without having to access a consumer device. In this way, it may be beneficial to audience measurement entities and/or data collection facilities to unobtrusively detect advertisements served in conjunction with online media.

Utilizing the central advertisement detecting engine reduces bandwidth consumed by tracking advertisements served at monitored households. In a household with limited bandwidth, by remotely detecting advertisements embedded in online media, an audience measurement entity would not consume excess bandwidth by persistent querying and/or on-device monitoring to determine which advertisements are being presented in conjunction with online media. Furthermore, the disclosed methods and apparatus reduce the consumption of computing resources utilized by end user computing devices by centralizing the detection of embedded advertisements. Thus, when crediting consumption of online media, end user computing devices do not need to analyze the online media to detect the advertisements. The reduction of computing resources is significant when considering the large number of end user devices.

Additionally, in some example, the disclosed methods and apparatus allow for computerized analysis of large amounts of online media. For example, one online media provider might host thousands of videos. Analyzing the one online media provider or many such online media approvers manually would not be feasible. For example, the disclosed methods and apparatus result in high accuracy detection of advertisements even when a person (e.g., an employee of an audience measurement entity) does not manually watch the online media for the purpose of identifying the advertisements.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
an event notification detector to determine a first time associated with an event notification embedded in primary media received from an online media provider at an audience measurement site, the primary media also to be distributed by the online media provider to a consumer device, the event notification detector to determine the first time by:
rendering a graphical representation of progress associated with presentation of the primary media, the graphical representation to have a length and to include the event notification at a location on the graphical representation; and
determining the first time based on the length of the graphical representation and the location of the event notification;
a media feature detector to determine a second time associated with a media feature of the primary media received from the online media provider at the audience measurement site; and
a correlator to indicate, without accessing the consumer device, that secondary media received from the online media provider at the audience measurement site is also to be embedded in the primary media distributed to the consumer device when a difference between the first time and the second time meets a threshold, at least one of the event notification detector, the media feature detector, or the correlator implemented with a logic circuit.

2. The apparatus of claim 1, further including an extractor to extract a portion of the secondary media in response to determining the secondary media is embedded in the primary media.

3. The apparatus of claim 2, further including an identifier to determine, from the portion of the secondary media, an identity of the secondary media.

4. The apparatus of claim 1, wherein the media feature detector is further to obtain information that describes the graphic representation from auxiliary data accompanying the primary media.

5. The apparatus of claim 1, wherein the event notification detector is further to:
obtain a presentation time of the primary media;
determine a ratio of the location of the event notification and the length of the graphical representation; and
multiply the ratio and the presentation time to determine the first time.

6. The apparatus of claim 1, wherein the correlator is further to identify the second time as a start time of the secondary media in response to determining that secondary media is embedded in the primary media.

7. The apparatus of claim 6, wherein the correlator is further to determine an end time of the secondary media in response to identifying the second time as a start time of the secondary media.

8. A method comprising:
  determining, by executing an instruction with a processor of an audience measurement entity, a first time associated with an event notification embedded in primary media received from an online media provider by the audience measurement entity, the primary media also to be distributed by the online media provider to a consumer device, the determining of the first time including:
    rendering a graphical representation of progress associated with presentation of the primary media, the graphical representation having a length and including the event notification at a location on the graphical representation; and
    determining the first time based on the length of the graphical representation and the location of the event notification;
  determining, by executing an instruction with the processor of the audience measurement entity, a second time associated with a media feature of the primary media received from the online media provider by the audience measurement entity; and
  indicating, by executing an instruction with the processor of the audience measurement entity and without accessing the consumer device, that secondary media received from the online media provider by the audience measurement entity is also to be embedded in the primary media distributed to the consumer device when a difference between the first time and the second time meets a threshold.

9. The method of claim 8, further including extracting a portion of the secondary media in response to determining the secondary media is embedded in the primary media.

10. The method of claim 9, further including determining, from the portion of the secondary media, an identity of the secondary media.

11. The method of claim 8, wherein the media feature is associated with at least one of a visual change or an auditory change detected in the primary media.

12. The method of claim 8, wherein the determining of the first time associated with event notification further includes:
  obtaining a presentation time of the primary media;
  determining a ratio of the location of the event notification and the length of the graphical representation associated with the primary media; and
  multiplying the ratio and the presentation time to determine the first time.

13. The method of claim 8, further including, in response to determining that secondary media is embedded in the primary media, identifying the second time as a start time of the secondary media.

14. The method of claim 13, further including, in response to identifying the second time as a start time of the secondary media, determining an end time of the secondary media.

15. A non-transitory computer readable medium comprising computer readable instructions that, when executed, cause a processor to at least:
  determine, at an audience measurement site, a first time associated with an event notification embedded in primary media received from an online media provider at the audience measurement site, the primary media also to be distributed by the online media provider to a consumer device, wherein to determine the first time, the instructions cause the processor to at least:
    render a graphical representation of progress associated with presentation of the primary media, the graphical representation to have a length and to include the event notification at a location on the graphical representation; and
    determine the first time based on the length of the graphical representation and the location of the event notification;
  determine, at the audience measurement site, a second time associated with a media feature of the primary media received from the online media provider at the audience measurement site; and
  indicate, at the audience measurement site and without accessing the consumer device, that secondary media received from the online media provider at the audience measurement site is also to be embedded in the primary media distributed to the consumer device when a difference between the first time and the second time meets a threshold.

16. The non-transitory computer readable medium of claim 15, further including instructions that, when executed, cause the processor to extract a portion of the secondary media in response to determining the secondary media is embedded in the primary media.

17. The non-transitory computer readable medium of claim 15, wherein the media feature is associated with at least one of a visual change or an auditory change detected in the primary media.

18. The non-transitory computer readable medium of claim 15, further including instructions that, when executed, cause the processor to:
  obtain a presentation time of the primary media;
  determine a ratio of the location of the event notification and the length of the graphical representation; and
  multiply the ratio and the presentation time to determine the first time.

19. The non-transitory computer readable medium of claim 15, further including instructions that, when executed, cause the processor to identify the second time as a start time of the secondary media in response to determining that secondary media is embedded in the primary media.

20. The non-transitory computer readable medium of claim 19, further including instructions that, when executed, cause the processor to determine an end time of the secondary media in response to identifying the second time as a start time of the secondary media.

* * * * *